United States Patent
Totori

(10) Patent No.: US 10,863,089 B2
(45) Date of Patent: Dec. 8, 2020

(54) IMAGE CAPTURING CONTROL APPARATUS, CONTROL METHOD FOR THE SAME, AND STORAGE MEDIUM

(71) Applicant: CANON KABUSHIKI KAISHA, Tokyo (JP)

(72) Inventor: Yuki Totori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/536,694

(22) Filed: Aug. 9, 2019

(65) Prior Publication Data

US 2020/0053284 A1    Feb. 13, 2020

(30) Foreign Application Priority Data

Aug. 13, 2018 (JP) .................................. 2018-152435

(51) Int. Cl.
*H04N 5/232* (2006.01)
*H04N 5/225* (2006.01)
*G06F 3/0488* (2013.01)

(52) U.S. Cl.
CPC ....... *H04N 5/23245* (2013.01); *G06F 3/0488* (2013.01); *H04N 5/2252* (2013.01); *H04N 5/23212* (2013.01); *H04N 5/23216* (2013.01)

(58) Field of Classification Search
CPC ........... H04N 5/23245; H04N 5/23212; H04N 5/23216; H04N 5/232935; G06F 3/04847; G06F 3/04845; G06F 3/0488; G06F 3/041
See application file for complete search history.

(56) References Cited

U.S. PATENT DOCUMENTS

| 9,195,311 | B2* | 11/2015 | Masuda | G03B 17/38 |
|---|---|---|---|---|
| 9,560,261 | B2* | 1/2017 | Ishihara | G03B 13/02 |
| 10,635,135 | B2* | 4/2020 | Hirakata | H01L 51/0097 |
| 2009/0184935 | A1* | 7/2009 | Kim | G06F 3/0416 345/173 |
| 2010/0020222 | A1* | 1/2010 | Jones | H04N 5/772 348/333.02 |
| 2013/0120311 | A1* | 5/2013 | Ichikawa | G06F 3/0416 345/174 |
| 2014/0028885 | A1* | 1/2014 | Ma | H04N 5/23245 348/333.01 |

(Continued)

FOREIGN PATENT DOCUMENTS

JP        2010-035107 A      2/2010

*Primary Examiner* — Shahbaz Nazrul
(74) *Attorney, Agent, or Firm* — Cowan, Liebowitz & Latman, P.C.

(57) ABSTRACT

An apparatus comprises: a detector configured to detect a pressing force applied to a specific operation member; and at least one processor which function as a control unit configured to: responsive to detection of pressing with a first pressure or more on the member during a first operation mode, perform control so that a transition to a second operation mode is made; responsive to detection of pressing with a second pressure or more during the second operation mode, perform control so that a shooting preparation process is performed, the second pressure being smaller than the first pressure; and responsive to detection of pressing with a third pressure or more during the second operation mode, perform control so that shooting is performed, the third pressure being greater than the second pressure.

21 Claims, 8 Drawing Sheets

(56) References Cited

U.S. PATENT DOCUMENTS

| | | | | |
|---|---|---|---|---|
| 2015/0067513 A1* | 3/2015 | Zambetti | ............... | G06F 3/0488 |
| | | | | 715/716 |
| 2016/0132206 A1* | 5/2016 | Kawaguchi | ........ | H04N 5/23293 |
| | | | | 715/845 |
| 2017/0257559 A1* | 9/2017 | Stricker | .............. | G06F 3/04883 |

* cited by examiner

FIG. 3G
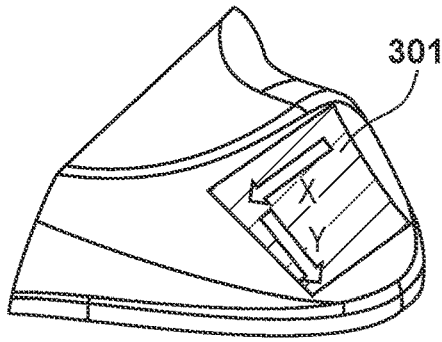
FIG. 3H
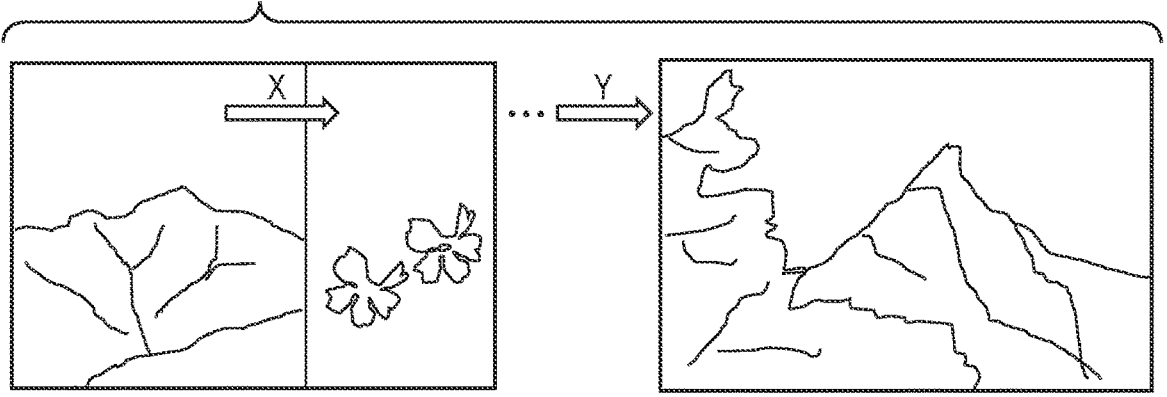
FIG. 3I
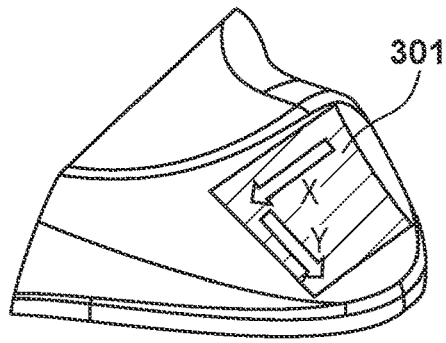
FIG. 3J

IMAGE CAPTURING CONTROL APPARATUS, CONTROL METHOD FOR THE SAME, AND STORAGE MEDIUM

BACKGROUND OF THE INVENTION

Field of the Invention

The present invention relates to an image capturing control apparatus, a control method for the image capturing control apparatus, and a storage medium.

Description of the Related Art

Conventionally, image capturing apparatuses are known in which operation members such as a setting change button and a rotary dial are arranged to be near the index finger and the thumb so that shooting settings can be changed while gripping the image capturing apparatus for shooting. With such an image capturing apparatus, a photographer first places his/her index finger and thumb on a release button and a button or the like to be used during shooting, respectively, and performs shooting, and repositions a finger to the setting change button, the rotary dial, etc., when changing settings. If the photographer changes settings in such a manner while looking through the finder, the photographer cannot see the operation members. As a result of this, a mis-operation may occur when the photographer repositions his/her fingers and the photographer may miss a shooting opportunity while repositioning his/her fingers. That is, there is demand for an operation member that requires little finger repositioning and that can be easily operated during shooting.

In response to such a problem, Japanese Patent Laid-open No. 2010-35107 proposes an image capturing apparatus in which a touch panel capable of sensing pressing is arranged at a position on which a photographer can place a finger of his/hers. This image capturing apparatus performs a release operation if the photographer presses a predetermined button region with a pressing force greater than or equal to a predetermined threshold, and, if the photographer moves a finger over the region in the top-bottom direction or the left-right direction with a pressing force smaller than the predetermined threshold, adjusts the zoom position in accordance with the direction in which the operation is performed. With such an image capturing apparatus, finger repositioning performed by the photographer is reduced with regard to the release operation and the zoom operation.

However, the technique proposed in Japanese Patent Laid-open No. 2010-35107 did not take into consideration suppressing the occurrence of mis-operations between operations performed during shooting and operations performed at times other than shooting, i.e., operations performed during menu setting and reproduction. For this reason, it is assumed that the shutter release operation would be performed and unintentional transition to the shooting state would be made were the pressing force to be greater than or equal to the predetermined threshold in a case in which the touch panel disclosed in Japanese Patent Laid-open No. 2010-35107 is operated for operations performed during menu setting and reproduction.

SUMMARY OF THE INVENTION

The present disclosure has been made in consideration of the aforementioned issues, and realizes a technique with which it is possible to operate a specific operation member quickly and with a small amount of force while suppressing the occurrence of mis-operations.

In order to solve the aforementioned problems, one aspect of the present disclosure provides an image capturing control apparatus comprising: a detector configured to detect a pressing force applied to a specific operation member; and at least one memory and at least one processor which function as a control unit configured to: in response to detection of pressing with a first pressure or more performed on the specific operation member during a first operation mode in which a live view image captured by an image sensor is not displayed on a display, perform control so that a transition to a second operation mode in which a live view image captured by the image sensor is displayed on the display is made; in response to detection of pressing with a second pressure or more performed on the specific operation member during the second operation mode, perform control so that a shooting preparation process is performed, the second pressure being smaller than the first pressure; and in response to detection of pressing with a third pressure or more performed on the specific operation member during the second operation mode, perform control so that shooting by the image sensor is performed and an image obtained by the shooting is stored as an image file, the third pressure being greater than the second pressure.

Another aspect of the present disclosure provides an image capturing control apparatus comprising: a detector configured to detect a pressing force applied to a specific operation member; and at least one memory and at least one processor which function as a control unit configured to: in response to detection of pressing with a first pressure or more performed on the specific operation member during a first operation mode in which a specific shooting setting of an image sensor is not displayed on a display, perform control so that a transition to a second operation mode in which the specific shooting setting is displayed on the display is made; in response to detection of pressing with a second pressure or more performed on the specific operation member during the second operation mode, perform control so that a shooting preparation process is performed, the second pressure being smaller than the first pressure; and in response to detection of pressing with a third pressure or more performed on the specific operation member during the second operation mode, perform control so that shooting by the image sensor is performed and an image obtained by the shooting is stored as an image file, the third pressure being greater than the second pressure.

Still another aspect of the present disclosure provides a control method of an image capturing control apparatus including a detector configured to detect a pressing force applied to a specific operation member, the control method comprising: in response to detection of pressing with a first pressure or more performed on the specific operation member during a first operation mode in which a live view image captured by an image sensor is not displayed on a display, performing control so that a transition to a second operation mode in which a live view image captured by the image sensor is displayed on the display is made; in response to detection of pressing with a second pressure or more performed on the specific operation member during the second operation mode, performing control so that a shooting preparation process is performed, the second pressure being smaller than the first pressure; and in response to detection of pressing with a third pressure or more performed on the specific operation member during the second operation mode, performing control so that shooting by the image sensor is performed and an image obtained by the shooting is stored as an image file, the third pressure being greater than the second pressure.

Yet another aspect of the present disclosure provides a control method of an image capturing control apparatus including a detector configured to detect a pressing force applied to a specific operation member, the control method comprising: in response to detection of pressing with a first pressure or more performed on the specific operation member during a first operation mode in which a specific shooting setting of an image sensor is not displayed on a display, performing control so that a transition to a second operation mode in which the specific shooting setting is displayed on the display is made; in response to detection of pressing with a second pressure or more performed on the specific operation member during the second operation mode, performing control so that a shooting preparation process is performed, the second pressure being smaller than the first pressure; and in response to detection of pressing with a third pressure or more performed on the specific operation member during the second operation mode, performing control so that shooting by the image sensor is performed and an image obtained by the shooting is stored as an image file, the third pressure being greater than the second pressure.

Still yet another aspect of the present disclosure provides a non-transitory computer-readable storage medium storing a program for causing a computer to execute a control method of an image capturing control apparatus including a detector configured to detect a pressing force applied to a specific operation member, the control method comprising: in response to detection of pressing with a first pressure or more performed on the specific operation member during a first operation mode in which a live view image being captured by an image sensor is not displayed on a display, performing control so that a transition to a second operation mode in which a live view image being captured by the image sensor is displayed on the display is made; in response to detection of pressing with a second pressure or more performed on the specific operation member during the second operation mode, performing control so that a shooting preparation process is performed, the second pressure being smaller than the first pressure; and in response to detection of pressing with a third pressure or more performed on the specific operation member during the second operation mode, performing control so that shooting by the image sensor is performed and an image obtained by the shooting is stored as an image file, the third pressure being greater than the second pressure.

Yet still another aspect of the present disclosure provides a non-transitory computer-readable storage medium storing a program for causing a computer to execute a control method of an image capturing control apparatus including a detector configured to detect a pressing force applied to a specific operation member, the control method comprising: in response to detection of pressing with a first pressure or more performed on the specific operation member during a first operation mode in which a specific shooting setting of an image sensor is not displayed on a display, performing control so that a transition to a second operation mode in which the specific shooting setting is displayed on the display is made; in response to detection of pressing with a second pressure or more performed on the specific operation member during the second operation mode, performing control so that a shooting preparation process is performed, the second pressure being smaller than the first pressure; and in response to detection of pressing with a third pressure or more performed on the specific operation member during the second operation mode, performing control so that shooting by the image sensor is performed and an image obtained by the shooting is stored as an image file, the third pressure being greater than the second pressure.

According to the present invention, it is possible to operate a specific operation member quickly and with a small amount of force while suppressing the occurrence of mis-operations.

Further features of the present invention will become apparent from the following description of an exemplary embodiment (with reference to the attached drawings).

BRIEF DESCRIPTION OF THE DRAWINGS

The accompanying drawings, which are incorporated in and constitute a part of the specification, illustrate an embodiment of the invention, and together with the description, serve to explain the principles of the invention.

FIGS. 3A to 3J are diagrams describing a touch operation member according to the present embodiment.

DESCRIPTION OF THE EMBODIMENT

In the following, an exemplary embodiment of the present invention will be described in detail, with reference to the drawings. Note that in the following description, a digital camera that is capable of detecting a pressing force applied to a specific operation member is described as one example of the image capturing control apparatus according to the present embodiment.

Configurations of Digital Camera and Shooting Lens Unit

Figure 1:
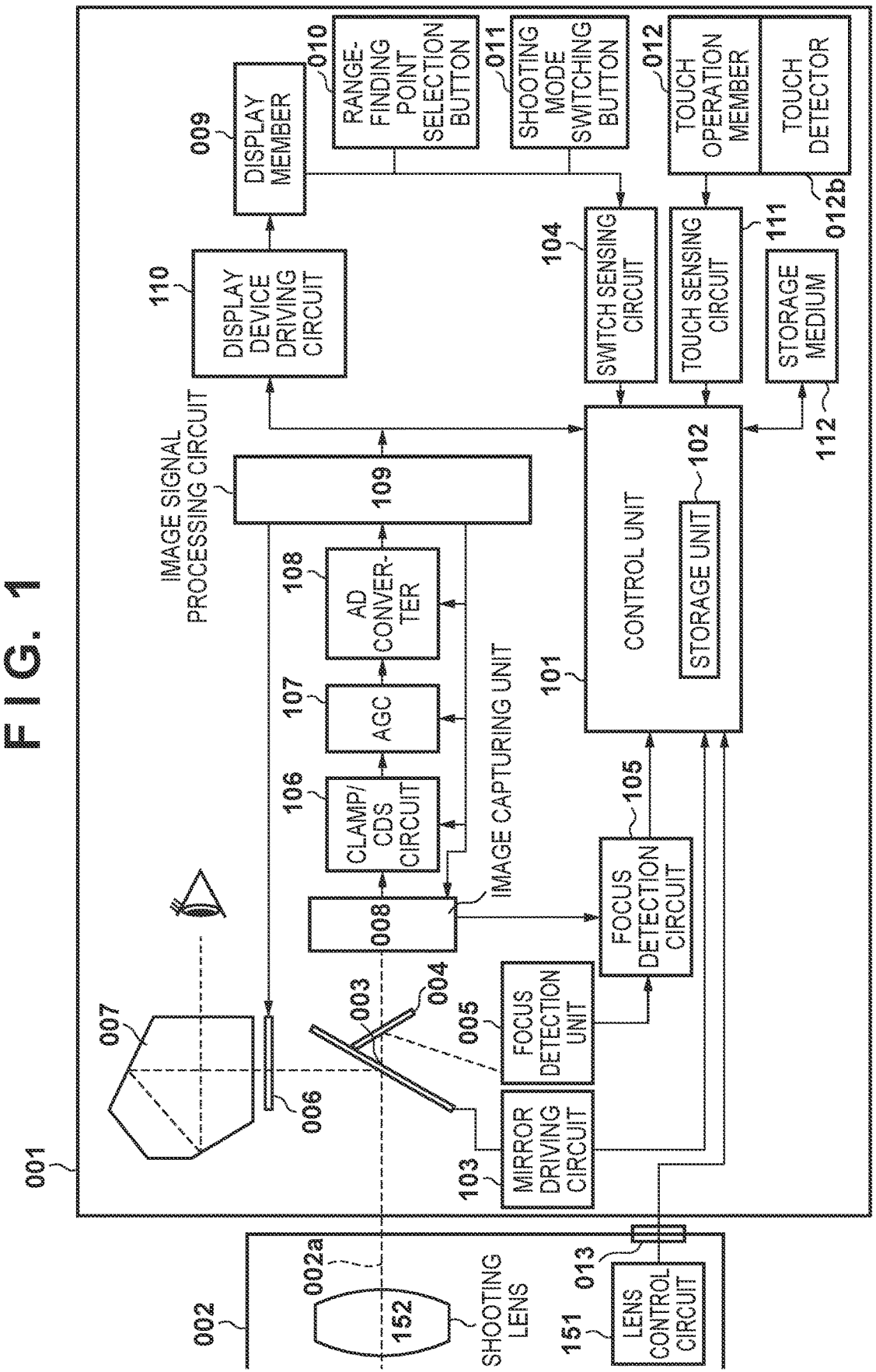
FIG. 1 is a block diagram showing an example of a functional configuration of an image capturing control apparatus and a shooting lens unit included in an image capturing system according to the present embodiment.

FIG. 1 shows an example of a functional configuration of an image capturing system in the present embodiment. The image capturing system includes a digital camera 001 and a shooting lens unit 002.

A control unit 101 is a control unit constituted by at least one processor or circuit, and controls the entire digital camera 001. For example, the control unit 101 realizes each of the later-described processes of the present embodiment by executing a program stored in a storage medium 112. The control unit 101 includes a storage unit 102 constituted by a DRAM or the like, for example, and constants and variables for the operation of the control unit 101, a program read from the storage unit 102, etc., are loaded to the storage unit 102. Furthermore, the control unit 101 also performs display control by controlling a display device driving circuit 110, a display member 009, etc.

A mirror driving circuit 103, a switch sensing circuit 104, a focus detection circuit 105, and an image signal processing circuit 109 are connected to the control unit 101. These circuits operate under control by the control unit 101. The control unit 101 communicates with a lens control circuit 151 in the shooting lens unit 002, via a mount contact 013. The mount contact 013 also has a function of transmitting a signal to the control unit 101 upon connection of the shooting lens unit 002. Accordingly, the lens control circuit 151 is capable of communicating with the control unit 101, and of driving a shooting lens 152 in the shooting lens unit 002 and bringing a subject into focus. A main mirror 003, in a state of being held at a 45° angle relative to an optical axis 002a, guides the flux of light passing through the shooting lens unit 002 to a finder unit 007 and also allows a portion of the flux of light to pass therethrough and guides the portion to a sub-mirror 004. The flux of light reflected by the sub-mirror 004 is guided to a focus detection unit 005 where phase-difference focus detection is performed. The focus detection unit 005 supplies the focus detection circuit 105 with focus information obtained by the focus detection. The focus detection circuit 105 performs a focus detection calculation based on the focus information, and calculates a defocus amount and a defocus direction. Based on the obtained defocus amount and defocus direction, the control unit 101 drives the shooting lens 152 to the focusing position, via the lens control circuit 151. Here, the control unit 101 may calculate the defocus amount and the defocus direction.

An image capturing unit 008 includes an image sensor that performs photoelectric conversion of a subject image. There are various types of image capturing elements, such as the CCD-type, the CMOS-type, and the CID-type, but any type may be used. The mirror driving circuit 103 includes a DC motor and a gear train, for example. The mirror driving circuit 103 selectively drives the main mirror 003 between a position where the subject image can be observed through a finder and a position at which the main mirror 003 is retracted upward from the photographic flux of light.

The finder unit 007 includes a penta dach prism or a penta dach mirror, for example, and converts the captured flux of light reflected by the main mirror 003 into a solid normal image and reflects the solid normal image. The photographer can observe the subject image through the finder unit 007. Furthermore, shooting conditions that are displayed, such as information regarding a currently-selected range-finding point, can be checked using an in-finder display unit 006. A clamp/correlated double sampling (CDS) circuit 106 is a circuit that performs processing on analog signals before AD conversion, and the clamp level can also be changed. An automatic gain controller (AGC) 107 performs operations on analog signals before AD conversion such as changing the AGC basic level. An AD converter 108 converts analog output signals from the image capturing unit 008 into digital signals (image data).

The image signal processing circuit 109 executes general hardware-based image processing on the digitalized image data, in addition to gamma/knee processing and filter processing, for example. Image data to be displayed on a monitor, which is output from this image signal processing circuit 109, is displayed on the display member 009 via the display device driving circuit 110.

The display member 009 is constituted of a TFT liquid crystal display device, for example, and is a display device that displays menu setting, such as various camera settings, reproduced images from a storage medium 112, a live view image during live view shooting, etc.

The switch sensing circuit 104 transmits input signals to the control unit 101 in accordance with the operation states of switches. If the photographer presses a range-finding point selection button 010, the control unit 101 causes a transition to a state in which the range-finding point can be moved to an arbitrarily-defined position. Furthermore, if the photographer presses a shooting mode switching button 011, the control unit 101 performs switching between a single shot mode in which shooting is performed once when a touch-triggered release operation is performed and a continuous shooting mode in which a plurality of images are shot during a touch-triggered release operation. Note that the range-finding point selection button 010 and the shooting mode switching button 011 each constitute an operation member.

A touch operation member 012 includes a touch detection unit 012b that is a touch detector capable of detecting electrostatic capacitance generated by touch operations. A touch sensing circuit 111 is capable of detecting the position and area of the contact made on the touch operation member 012, based on the output from the touch detection unit 012b, and transmits information indicating the pressing force (for example, the later-described electrostatic capacitance output value) and other types of touch operation information to the control unit 101. That is, the touch sensing circuit 111 functions as a detector that detects the position and pressing force of pressing performed on the operation member. The control unit 101 performs a shooting preparation process and a shooting process based on the information from the touch sensing circuit 111 indicating the pressing force, and controls menu operations, etc., based on other types of touch operation information from the touch sensing circuit 111. The processes that the control unit 101 performs in accordance with operations performed on the touch operation member 012 will be described later.

The storage medium 112 is a storage medium constituted by a semiconductor memory, a magnetic disc, or the like, and stores images that have been shot, various camera setting values, and a program.

Configuration of External Appearance of Digital Camera

Figure 2A:
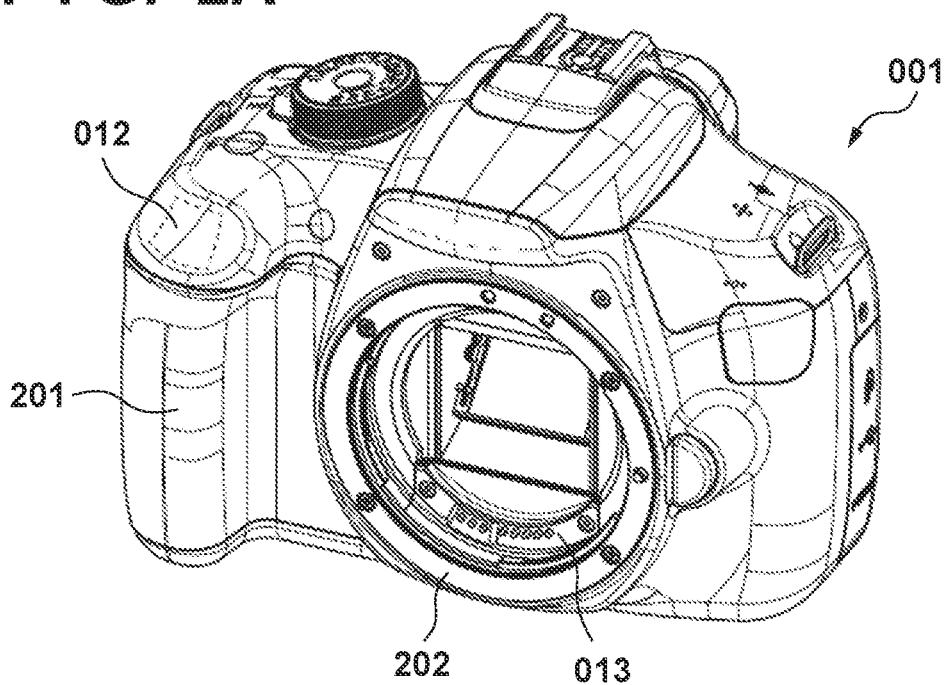
FIG. 2A is a front perspective view of a digital camera, which serves as one example of the image capturing control apparatus according to the present embodiment.
Figure 2B:
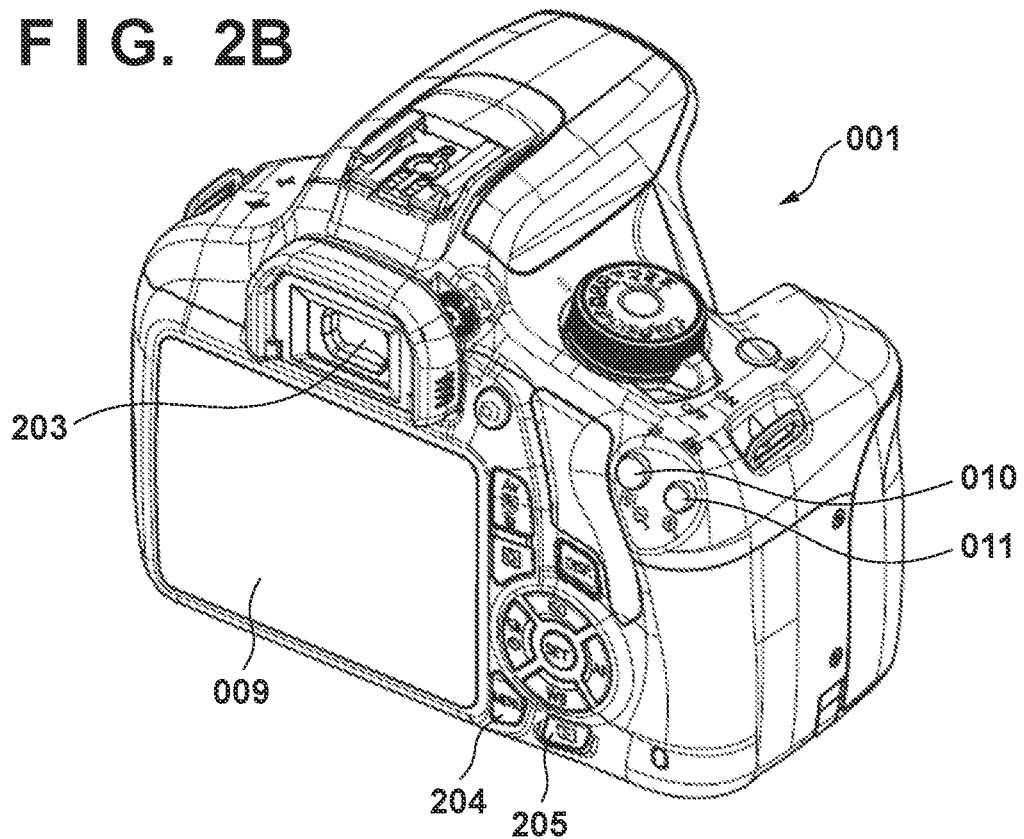
FIG. 2B is a rear perspective view of the digital camera according to the present embodiment.

Next, the configuration of the external appearance of the digital camera 001 will be described, with reference to FIG. 2A and FIG. 2B. FIG. 2A shows a front perspective view of the digital camera 001, and FIG. 2B shows a rear perspective view of the digital camera 001.

A grip portion 201 is a portion of the digital camera 001 that the photographer holds during shooting, etc. The touch operation member 012 is disposed at the upper part of the grip portion 201, at a position where the photographer can perform operations with his/her index finger while holding the digital camera 001. The details of the configuration of the touch operation member 012 will be described later with reference to FIG. 3A.

A mount 202 is a ring-shaped metal member, for example, for mounting the shooting lens unit 002 (not shown in FIG. 2A) to the digital camera 001. On the inside of the mount 202, the mount contact 013 is disposed concentrically with the mount 202. The mount contact 013 has a plurality of contact points.

A finder ocular window 203 is attached to the side of the finder unit 007 opposite the subject, and the photographer can observe a subject image through the shooting lens unit 002 and the finder unit 007 by looking into the finder ocular window 203. The finder unit 007 includes the in-finder display unit 006, which functions as a display inside the finder.

In the rear surface part of the digital camera 001, the range-finding point selection button 010 and the shooting mode switching button 011, for example, are disposed at a portion where the photographer can perform operations with his/her thumb while holding the grip portion 201.

A menu button 204 and a reproduction button 205 each constitute an operation member and are disposed on the right side of the display member 009 on the rear surface part. The menu button 204 and the reproduction button 205 are arranged at a position where the photographer can perform operations with his/her thumb while holding the digital camera 001. By pressing the menu button 204 or the reproduction button 205, the photographer can perform menu setting operations or can reproduce images that have been shot, while checking the display member 009.

Configuration of Touch Operation Member

Figure 3A:
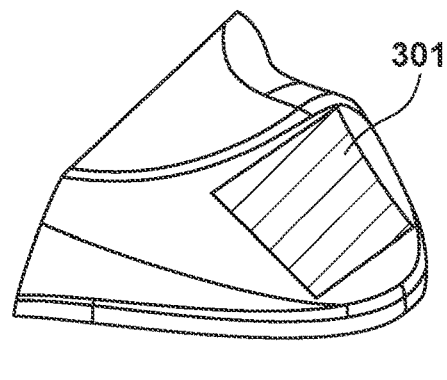
Figure 3B:
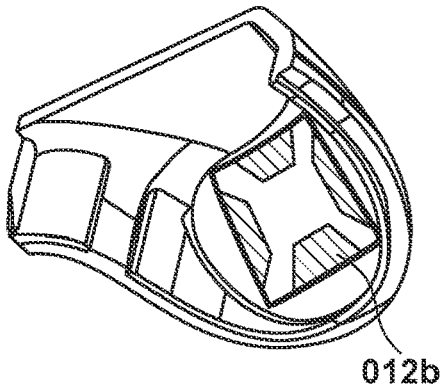
Figure 3C:
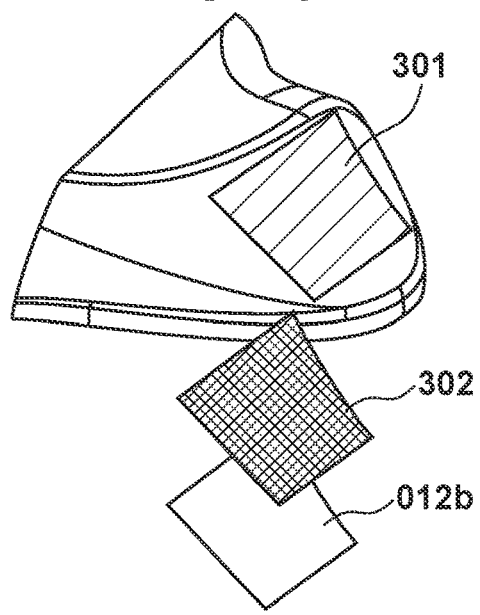
Figure 3D:
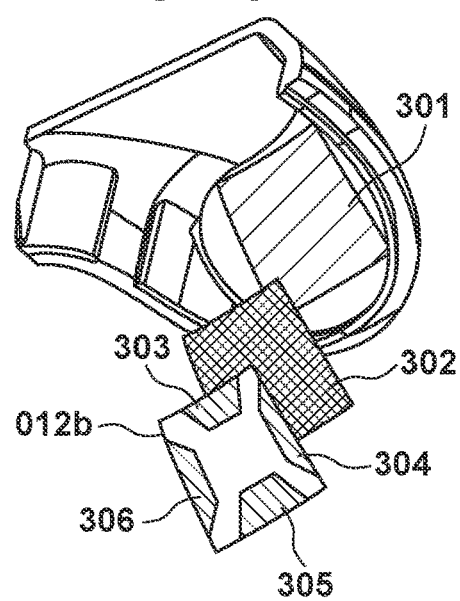

Next, the configuration of the touch operation member 012 in the present embodiment will be described, with reference to FIGS. 3A and 3B. FIG. 3A shows a partial perspective view of the touch operation member 012 according to the present embodiment. The touch operation member 012 is an operation member configured so that touch operations can be performed on a part of an outer housing of the digital camera 001, and touch operations can be performed within a touch operation region 301. The touch detection unit 012b is arranged so as to cover the touch operation region 301, as shown in the rear-view partial perspective view in FIG. 3B. Furthermore, as shown in the partially blown-up perspective view in FIG. 3C, the touch detection unit 012b is fixed to the rear surface of the outer housing by using a fixing member 302, which is an adhesive or the like. FIG. 3D shows a partially blown-up perspective view corresponding to the partially blown-up perspective view in FIG. 3C. FIG. 3D is a view from the rear side of the touch operation member. The details of the configuration of the touch detection unit 012b will be described with reference to FIG. 3E.

Because the touch operation member 012 is configured to form a part of the outer housing, there is no need to provide any holes for installing buttons in the outer housing and favorable dust-proof/drip-proof performance can be achieved, and the design flexibility of the external appearance of the digital camera 001 can be improved. Furthermore, the touch operation region 301 is arranged at a position where the photographer naturally places his/her index finger when holding the digital camera 001. In this way, the photographer does not need to reposition his/her index finger even when performing touch operations for changing camera settings, etc., and a stable holding state can be continuously maintained. Due to this, a digital camera 001 can be provided which has good operability and with which the photographer can instantaneously transition to shooting operations, and with which decisive moments will not be missed.

Figure 3E:
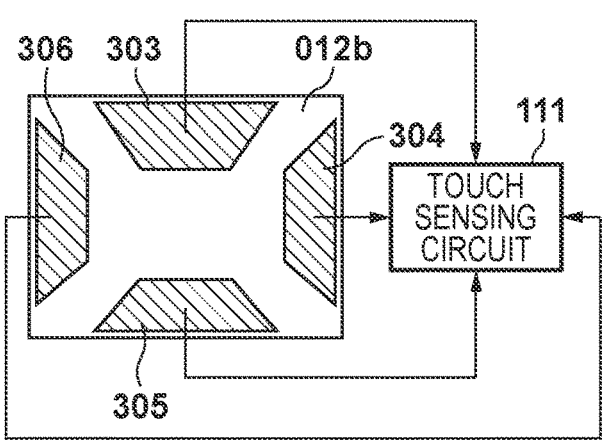

Next, the configuration of the touch detection unit 012b will be described with reference to FIG. 3E. FIG. 3E shows the configuration of the touch detection unit 012b of the touch operation member 012 according to the present embodiment. The touch detection unit 012b is constituted of a so-called flexible printed circuit (FPC) patterned on a polyimide base portion by using a copper foil. Within the outer shape of the touch detection unit 012b that covers the entire touch operation region 301, copper patterns 303, 304, 305, and 306 are formed at four positions, i.e., the top, bottom, left, and right positions, for example. For example, the copper pattern 303 is used as a top-side detection unit, and the copper pattern 305 is used as a bottom-side detection unit. Furthermore, the copper pattern 306 is used as a right-side detection unit, and the copper pattern 304 is used as a left-side detection unit. The copper patterns are each connected to the touch sensing circuit 111. The touch sensing circuit 111 detects changes in the electrostatic capacitance between corresponding ones of the top, bottom, left, and right touch detection units.

The control unit 101 detects the position and area of the contact made by a photographer's finger on the touch operation member 012, based on the balance of the results output from the touch sensing circuit 111. In such a manner, the touch operation member 012 is capable of detecting press direction operations and plane direction operations made by a photographer's finger.

Figure 3F:
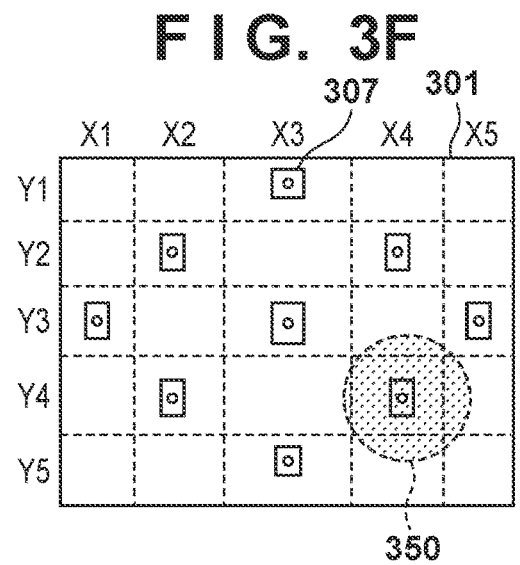

Next, the correspondence between plane direction operations performed on the touch operation member 012 and the selection of a range-finding point will be described, with reference to FIG. 3F. FIG. 3F shows the correspondence between sensitivity regions and range-finding points of the touch operation member 012 according to the present embodiment.

If the digital camera 001 is in a shooting standby state, the in-finder display unit 006 in the finder unit 007 displays range-finding point indicators 307. The photographer can visually confirm the range-finding point indicators 307 along with a subject image by looking into the finder ocular window 203. In this example, the number of range-finding points of the digital camera 001 is nine, and thus, nine range-finding point indicators 307 are arranged on a rhombus, as shown in FIG. 3F. Here, the area covering the range-finding point indicators 307 and the touch operation region 301 are set corresponding to one another. That is, the touch operation region 301 is split into five areas each in the vertical and horizontal directions into a total of 25 areas, in accordance with the layout of the range-finding point indicators 307.

For example, if a photographer's finger touches the touch operation member 012 within a region 350, the corresponding area (X4, Y4) is selected, and furthermore, the range-finding point at a position corresponding to this area is selected. When a range-finding point is selected in such a manner, the in-finder display unit 006 displays a range-finding point indicator 307 corresponding to the selected range-finding point so as to be distinguishable from the other indicators, by varying the color or brightness, for example.

Next, the correspondence between touch operations and menu setting operations will be described, with reference to FIG. 3G and FIG. 3H. FIG. 3G shows a screen state when a menu screen of the digital camera 001 according to the present embodiment is operated. Furthermore, FIG. 3H shows examples of touch operations made on the touch operation member 012 when the menu screen is operated. The control unit 101 is capable of changing the operation mode of the digital camera 001 to a menu setting operation state if the photographer presses the menu button 204. If the control unit 101 changes the operation mode to the menu setting operation state, the display member 009 displays a menu screen as shown in FIG. 3G, in which various pieces of camera setting information are displayed.

Suppose that the photographer performs an operation on the touch operation member 012 with the menu screen displayed on the display member 009. The operation performed by the photographer is, for example, a swipe operation (an operation of sliding a finger over the surface of the touch operation member 012 without taking the finger off the surface) in the direction of the arrow X (for the photographer, the right direction as seen from the rear surface of the camera) within the touch operation region 301, as shown in FIG. 3H. In this case, the control unit 101 controls the display member 009 and causes the display member 009 to switch the tab selected at the topmost part of the menu screen shown in FIG. 3G in the X direction (the right direction) and to display items corresponding to the selected tab below the tab.

Next, suppose that the photographer performs a swipe operation in the direction of the arrow Y (for the photographer, the lower direction as seen from the rear surface of the camera) within the touch operation region 301, as shown in FIG. 3H. In this case, the control unit 101 controls the display member 009 and causes the display member 009 to shift the item selected in the menu screen shown in FIG. 3G in the Y direction (the lower direction), so that contents corresponding to the item can be changed and set. Meanwhile, if the photographer performs swipe operations in directions opposite to the X and Y directions similarly on the touch operation member 012, the tab and item in the menu screen are shifted in opposite directions. That is, the control unit 101 controls the display on the display member 009 and performs processing corresponding to a selected item, in accordance with an operation that the photographer performs by moving the touch position while continuously touching the touch operation member 012.

Next, the correspondence between touch operations and reproduction operations will be described with reference to FIG. 3I and FIG. 3J. FIG. 3I shows an example of a reproduction screen of the digital camera 001. Furthermore, FIG. 3J shows examples of touch operations on the touch operation member 012 when reproduction operations are performed.

If the photographer presses the reproduction button 205, the control unit 101 switches the digital camera 001 to a reproduction operation state, and changes the display on the display member 009 to a reproduction screen as shown in FIG. 3I, which is for reproducing images that have been shot.

Here, the photographer performs a swipe operation in the direction of the arrow X (for the photographer, the right direction as seen from the rear surface of the camera) within the touch operation region 301, as shown in FIG. 3J. In this case, the control unit 101 controls the reproduction display such that, in the reproduction screen shown in FIG. 3I, the displayed image changes one image at a time in order from older images that have been shot to newer images that have been shot.

Meanwhile, the photographer performs a swipe operation in the direction of the arrow Y (for the photographer, the lower direction as seen from the rear surface of the camera) within the touch operation region 301, as shown in FIG. 3J. In this case, the control unit 101 controls the reproduction display such that, in the reproduction screen shown in FIG. 3I, the displayed image changes ten images at a time in order from older images that have been shot to newer images that have been shot.

Furthermore, if the photographer performs swipe operations in directions opposite to the X and Y directions on the touch operation member 012, in each case the control unit 101 controls the reproduction display on the reproduction screen in reverse to what is described above.

Note that the above-described swipe operations may be flick operations (operations performed by moving a finger quickly over the touch operation member 012 or by flicking the touch operation member 012 with a finger).

Threshold Processing Based on Pressing Force Applied to Operation Member

Figure 4A:
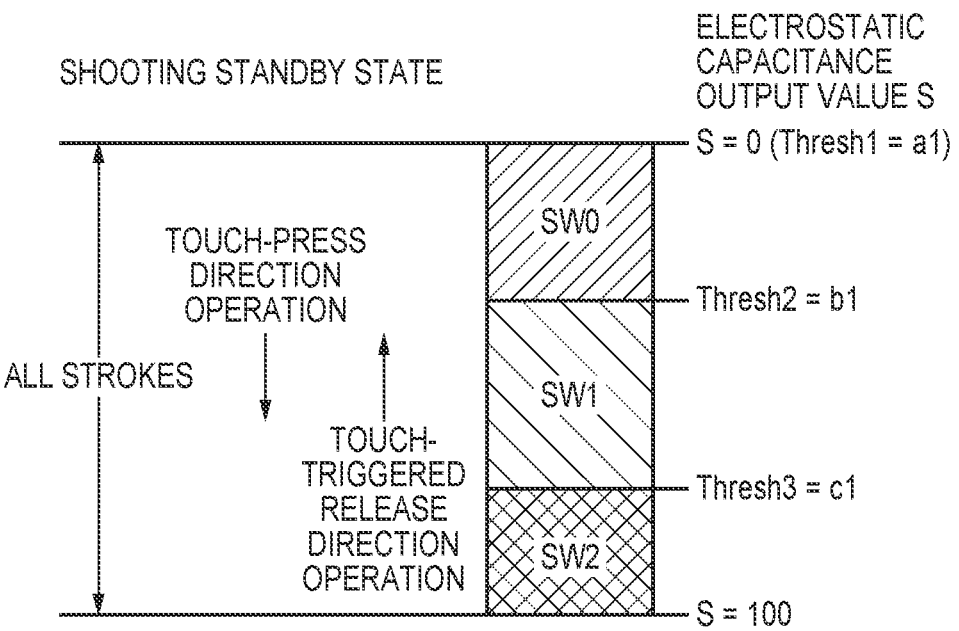
FIGS. 4A and 4B are diagrams each showing electrostatic capacitance threshold values and a pressing force applied to the touch operation member, in a case in which the digital camera according to the present embodiment is in a shooting standby state or in a state other than the shooting standby state.
Figure 4B:
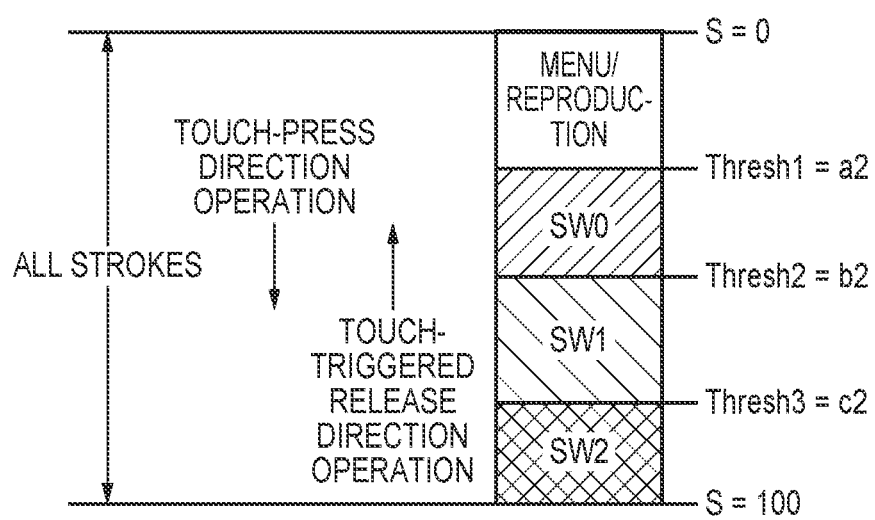

Next, threshold processing based on the pressing force applied to the touch operation member 012 will be described. FIG. 4A shows the relationship between the pressing force applied to the touch operation member and electrostatic capacitance threshold values in the shooting standby state, and FIG. 4B shows the relationship between the pressing force applied to the touch operation member and electrostatic capacitance threshold values in a state other than the shooting standby state. Note that the shooting standby state refers to a state corresponding to an operation mode in which a live view image captured by the image capturing unit 008 is displayed on the display member 009, for example. Alternatively, the shooting standby state may be a state in which a specific shooting setting of the image capturing unit 008 is displayed on the display member 009. On the other hand, states other than the shooting standby state are states corresponding to operation modes in which a live view image captured by the image capturing unit 008 is not displayed on the display member 009, for example. For example, states other than the shooting standby state refer to a state corresponding to a menu display mode in which a setting menu screen is displayed and a state corresponding to a reproduction mode in which stored images are reproduced and displayed. Alternatively, states other than the shooting standby state may be states in which a specific shooting setting of the image capturing unit 008 is not displayed on the display member 009.

In the examples shown in FIGS. 4A and 4B, an output value S indicating electrostatic capacitance is used to determine the pressing force applied to the operation member. When the pressing force increases, the area of contact of a photographer's finger with respect to the touch operation member 012 increases, and the electrostatic capacitance output value S also increases proportionally. In the examples in the present embodiment, a state in which a photographer's finger is not touching the touch operation member 012 is indicated as S=0 (the state at the upper side in the drawings). Furthermore, a state in which the touch operation member 012 is completely pressed down by a photographer's finger and the electrostatic capacitance output value S has reached the maximum is indicated as S=100 (the state at the lower side in the drawings).

In accordance with the value of the pressing force applied to the operation member, the control unit 101 causes the camera control state to transition between the three states (SW0, SW1, and SW2) described below. The state "SW0" is a range-finding point selection state in which a range-finding point is selected in accordance with the touch position of a photographer's finger. The state "SW1" corresponds to a state (an ON state) that is entered, in the case of a button-type shutter button, as a result of the shutter button being operated half-way, that is, a so-called half-press (shooting preparation instruction). The control unit 101 starts operations of a shooting preparation process, in which a light adjustment operation (auto exposure process) and a subject focusing operation (auto focus process) at the range-finding point selected in the state SW0, a light metering process, a pre-flash (EF) process, etc., are performed. The state "SW2" is a shooting state for performing shooting at the selected range-finding point position, and corresponds to a (an ON state) state that is entered, in the case of a button-type shutter button, as a result of the operation of the shutter button being completed, that is, a so-called "full press" (shooting instruction). The control unit 101 starts a series of shooting process operations, from the reading of signals from the image capturing unit 008 to the storage of image data to the storage medium 112 as an image file.

Here, the threshold values at which the transition to the states SW0, SW1, and SW2 occurs when a touch operation is performed on the touch operation member 012 are respectively defined as a first threshold value (Thresh1), a second threshold value (Thresh2), and a third threshold value (Thresh3).

As shown in FIG. 4A, the threshold values are set as follows in the case of the shooting standby state.

Thresh1=$a1$=0

Thresh2=$b1$(>0)

Thresh3=$c1$(<100)

For these threshold values, the same values may be used for both the press direction and release direction operations.

Furthermore, as shown in FIG. 4B, the threshold values are set as follows in the case of a state other than the shooting standby state.

Thresh1=$a2$(>0)

Thresh2=$b2$

Thresh3=$c2$(<100)

Here, the following holds true: b1≤b2; c1≤c2. Once the electrostatic capacitance output value S exceeds Thresh3=c2, the threshold values return to those in the shooting standby state shown in FIG. 4A.

As a result of Thresh1 (=a2) being set to a value greater than S=0 in a state other than the shooting standby state, a transition to the state SW0 is not made even if the pressure incurred by pressing performed on the touch operation member 012 is smaller than the pressure corresponding to a2. On the other hand, if the pressure incurred by pressing is more than or equal to the pressure corresponding to a2 (and smaller than the pressure corresponding to b2), an option selected by the photographer is set or the transition to SW0 is made. That is, if the photographer is performing a plane direction operation on the touch operation member 012, a mis-operation of unintentionally setting an option or unintentionally causing a transition to the state SW0 can be suppressed. Furthermore, the photographer can initiate the transition to the state SW0 of the shooting standby state by performing a slightly-strong press direction operation that is strong enough for the electrostatic capacitance output value S to exceed Thresh3=c2 on the touch operation member 012. In such a manner, while a situation is prevented in which the photographer accidentally initiates the transition to the shooting standby state from a state other than the shooting standby state, the photographer can quickly and nimbly provide a shooting preparation instruction with a small amount of force in the shooting standby state.

With such a configuration, a touch operation can be provided that can be performed quickly and with a small amount of force while suppressing the occurrence of mis-operations and that can be performed by the photographer while maintaining a stable holding state and without having to reposition his/her index finger to a different operation member.

Figure 5A:
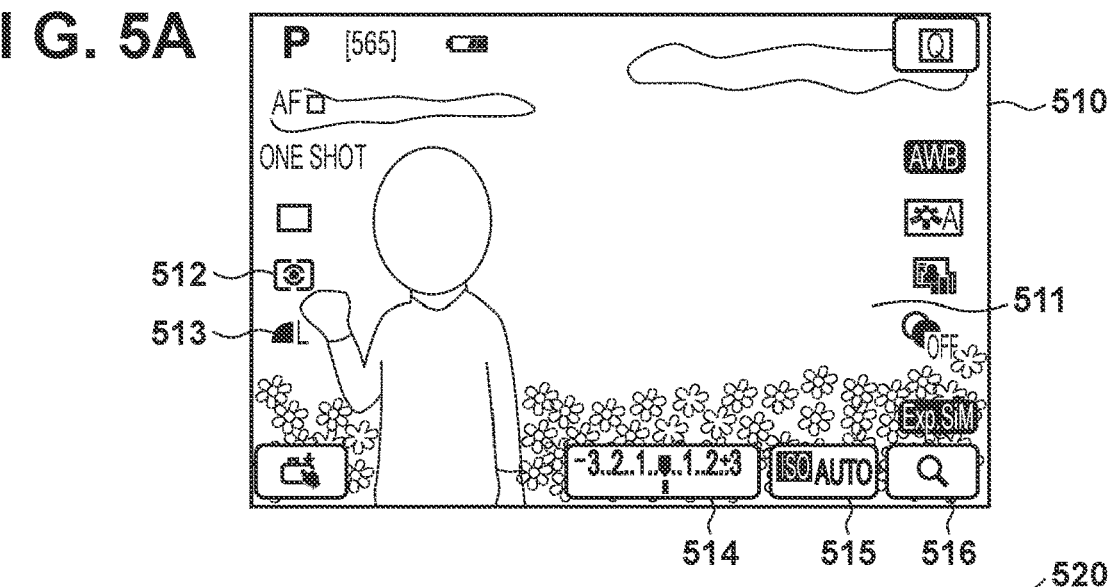
FIGS. 5A to 5C are diagrams showing display examples of a display member and the like in a shooting mode according to the present embodiment.

As described above, the shooting standby state is a state corresponding to an operation mode in which a live view image captured by the image capturing unit 008 is displayed on the display member 009, or a state in which a specific shooting setting of the image capturing unit 008 is displayed on the display member 009. A specific example of the state in which a live view image is displayed on the display member 009 will be described with reference to FIG. 5A.

A screen 510 shows one example of a screen 510 displayed on the display member 009 in the shooting standby state of the digital camera 001. On the screen 510, contents (setting values, etc.) of shooting settings for the shooting by the image capturing unit 008, which have been set in a state other than the shooting standby state, are displayed in a superimposed state on a live view image 511, and function buttons 514 to 516 for shooting are also displayed. The contents of the shooting settings include, for example, an indicator 512 indicating the light metering mode and an indicator 513 indicating the storage size or storage quality of images to be shot. The selection of function buttons may be performed by using a cursor that moves according to swipe operations performed on the touch operation member 012. The function button 514 is a button for changing the exposure. The function button 515 is a button for changing the ISO sensitivity. The function button 516 is a magnification button for causing a magnified live view image having a higher magnification than the live view image 511 to be displayed.

Figure 5B:
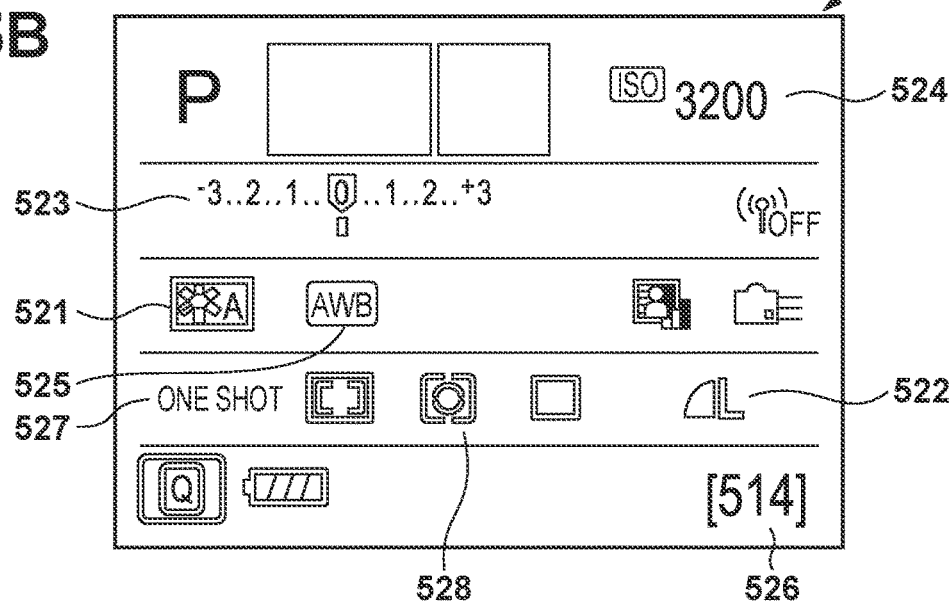

FIG. 5B shows an example of a screen 520 during shooting standby, in a case in which a live view image is not displayed. In this screen 520 during shooting standby, function buttons 521 to 526 are displayed as a list. The function buttons 521 to 526 are capable of displaying, for a plurality of setting items of the digital camera 001, the contents (setting values, etc.) of the current shooting settings. For example, the function button 521 indicates the shooting mode that is set from among a plurality of shooting modes, and the function button 522 indicates the storage size or storage quality of images to be shot. The function buttons 523, 524, and 525 respectively indicate exposure correction, ISO sensitivity, and white balance. Furthermore, the function button 526 indicates the remaining number of images that can be shot and stored to the storage medium 112. The function button 527 indicates the operation of the auto focus. The function button 528 indicates the light metering mode that is set. Shooting settings that are displayed, other than these, may include the aspect ratio of images to be shot, the strobe light emission setting during shooting, a self-timer setting for setting the time until shooting, the aperture, and the shutter speed. Furthermore, the moving image frame rate, and the remaining shooting time indicating the shooting time of moving images that can be stored to the storage medium 112 may be included.

Figure 5C:
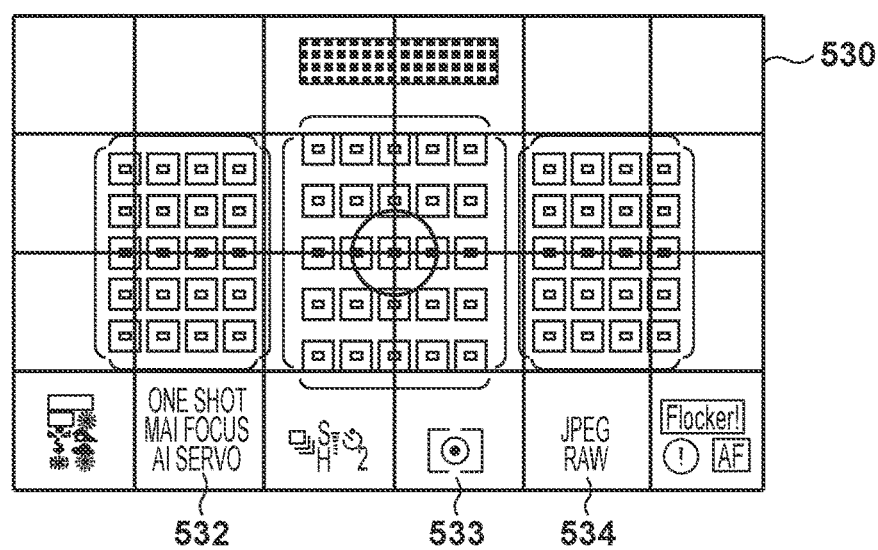

Furthermore, FIG. 5C shows an example of a screen 530 during shooting standby that is displayed in the optical finder. For example, the screen 530 is capable of displaying an item 532 indicating the operation of the auto focus, an item 533 indicating the light metering mode, and an item 534 indicating the storage size or storage quality of images to be shot. Other than these items, the screen 530 may display the items shown in FIGS. 5A and 5B.

On the other hand, as shown in the display example shown in FIG. 3I, the control unit 101 does not display the contents of shooting settings for the shooting by the image capturing unit 008 on the display member 009 in the reproduction mode.

Series of Operations Performed Until Shooting in Shooting Standby State is Performed Next, the series of operations performed until shooting in the shooting standby state is performed will be described with reference to FIG. 6. Note that this series of operations is realized by the control unit 101 loading a program stored in the storage medium 112 to the storage unit 102 and executing the program. Note that the present processing is started when the photographer holds the digital camera 001 and presses an unillustrated power button.

In step S601, the control unit 101 executes an activation process accompanying the turning-on of the digital camera 001. Suppose that the photographer holds up the digital camera 001 to prepare for shooting when the control unit 101 turns on the digital camera 001.

In step S602, the control unit 101 determines whether or not either the menu button 204 or the reproduction button 205 has been pressed. If the control unit 101 determines that either the menu button 204 or the reproduction button 205 has been pressed based on a notification from these operation members, the control unit 101 proceeds to step S703, which is later-described with reference to FIG. 7. The control unit 101 proceeds to step S603 if the control unit 101 determines that these operation members have not been pressed.

In step S603, the control unit 101 sets the first, second, and third threshold values as shown below.

Thresh1=$a1$=0

Thresh2=$b1$

Thresh3=$c1$

In step S604, the control unit 101 determines the pressing force applied by a photographer's finger. Specifically, the control unit 101 determines whether the electrostatic capacitance output value S satisfies S>0 based on the result of the detection by the touch sensing circuit 111, which has detected a press direction operation made by the photographer's finger input to the touch operation member 012. If the control unit 101 determines that the electrostatic capacitance output value S does not satisfy S>0, the control unit 101 returns to step S604 to wait for an operation from the photographer. Otherwise, the control unit 101 proceeds to step S605.

In step S605, the control unit 101 determines whether or not the range-finding point selection button 010 has been pressed by the photographer. If the control unit 101 determines that the range-finding point selection button 010 has been pressed, the control unit 101 proceeds to step S606 in order to perform processing in response to a touch plane direction operation made by the photographer's finger input to the touch operation member 012. Otherwise, the control unit 101 proceeds to step S613.

In step S606, the touch sensing circuit 111 detects a touch plane direction operation made by the photographer's finger input to the touch operation member 012. In step S607, the control unit 101 moves the range-finding point by following the detected finger position (that is, performs processing in accordance with an operation in which the photographer moves the touch position without the touch being released).

In step S608, the control unit 101 determines a press direction operation made by the photographer's finger input to the touch operation member 012, which has been detected by the touch sensing circuit 111. Based on the result of the detection by the touch sensing circuit 111, the control unit 101 determines whether the electrostatic capacitance output value S satisfies S≥b1, and proceeds to step S609 if the control unit 101 determines that S≥b1 is satisfied. Otherwise, the control unit 101 returns to step S606 to detect movement of the range-finding point following the position of the finger in a plane direction operation once again.

In step S609, the control unit 101 sets the range-finding point corresponding to the position of the photographer's finger as the selected range-finding point. Then, in step S610, the control unit 101 controls the focus detection circuit 105, for example, and performs shooting preparation operations (for example, the auto focus process and the auto exposure process) at the set range-finding point.

In step S611, the control unit 101 further determines whether the electrostatic capacitance output value S that is detected satisfies S≥c1. If the control unit 101 determines that S≥c1 is satisfied, the control unit 101 determines that a shooting instruction has been provided by the photographer and proceeds to step S612. Otherwise, the control unit 101 repeats the processing in step S610. In step S612, the control unit 101 controls parts of the digital camera 001 and starts a predetermined shooting operation. The control unit 101 ends the present series of operations once the predetermined shooting operation is completed.

Meanwhile, if the control unit 101 determines that the range-finding point selection button 010 was not pressed in step S605, the control unit 101 sets the range-finding point that was set the last time shooting was performed as the selected range-finding point in step S613.

In step S614, the control unit 101 determines a press direction operation made by the photographer's finger input to the touch operation member 012, which has been detected by the touch sensing circuit 111. For example, the control unit 101 determines whether the electrostatic capacitance output value S detected by the touch sensing circuit 111 satisfies S≥b1. If the control unit 101 determines that S≥b1 is satisfied, the control unit 101 proceeds to step S610. Otherwise, the control unit 101 returns to step S605 and continues to perform the determination of whether or not the range-finding point selection button 010 has been pressed.

Series of Operations Performed Until Shooting in State Other than Shooting Standby State is Performed Next, the series of operations performed until shooting in a state other than the shooting standby state is performed will be described with reference to FIG. 7. Note that this processing is realized by the control unit 101 loading a program stored in the storage medium 112 on the storage unit 102 and executing the program, similarly to the series of operations shown in FIG. 6. Note that the present processing is started when the photographer holds the digital camera 001 and presses the unillustrated power button.

The control unit 101 executes the processing in steps S601 and S602 similarly to what has been described with reference to FIG. 6, and returns to step S603 if the control unit 101 determines that neither the menu button 204 nor the reproduction button 205 has been pressed. On the other hand, the control unit 101 proceeds to step S703 if the control unit 101 determines that either the menu button 204 or the reproduction button 205 has been pressed.

In step S703, the control unit 101 sets the first, second, and third threshold values as shown below.

Thresh1=$a2$

Thresh2=$b2$

Thresh3=$c2$

In step S704, the touch sensing circuit 111 detects a touch plane direction operation made by the photographer's finger input to the touch operation member 012. In step S705, the control unit 101 executes a menu setting operation or a reproduction operation in accordance with the touch plane direction operation detected by the touch sensing circuit 111.

The menu setting operation and the reproduction operation are those described above with reference to FIG. 3G to FIG. 3J, and the control unit 101 changes the display on the display member 009 in accordance with the detected plane detection position.

In step S706, the control unit 101 determines whether the electrostatic capacitance output value S satisfies S≥a2, based on a press direction operation made by the photographer's finger input to the touch operation member 012, which has been detected by the touch sensing circuit 111. If the control unit 101 determines that S≥a2 is not satisfied, the control unit 101 returns to step S704 in order to detect a touch plane direction operation made by a finger. Otherwise (i.e., if S≥a2 is satisfied), the control unit 101 proceeds to step S707.

In step S707, the control unit 101 determines whether or not the range-finding point selection button 010 has been pressed by the photographer. If the control unit 101 determines that the range-finding point selection button 010 has been pressed, the control unit 101 proceeds to step S708. Otherwise, the control unit 101 proceeds to step S715.

In step S708, the touch sensing circuit 111 detects a touch plane direction operation made by the photographer's finger input to the touch operation member 012. Then, in step S709, the control unit 101 moves the range-finding point so as to follow the position of the finger, in accordance with the touch plane direction operation detected by the touch sensing circuit 111.

In step S710, the control unit 101 determines whether the electrostatic capacitance output value S satisfies S≥b2, based on a press direction operation made by the photographer's finger input to the touch operation member 012, which is detected by the touch sensing circuit 111. If the control unit 101 determines that the electrostatic capacitance output value S satisfies S≥b2, the control unit 101 proceeds to step S711. Otherwise, the control unit 101 returns the processing to step S708.

In step S711, the control unit 101 sets the range-finding point corresponding to the position of the photographer's finger as the selected range-finding point. In step S712, the control unit 101 performs shooting preparation operations (for example, the auto focus process and the auto exposure process) at the set range-finding point. In step S713, the control unit 101 further determines whether the electrostatic capacitance output value S satisfies S≥c2. If the control unit 101 determines that S≥c2 is satisfied, the control unit 101 determines that a shooting instruction has been provided and proceeds to step S714. Otherwise, the control unit 101 returns to step S712.

In step S714, the control unit 101 starts a predetermined shooting operation in response to the shooting instruction. After the predetermined shooting operation is completed, the control unit 101 proceeds to step S603 shown in FIG. 6, and proceeds to perform operations for shooting control in the normal shooting standby state.

Meanwhile, in step S715, the control unit 101 sets the range-finding point that was set the last time shooting was performed as the selected range-finding point, because it was determined in step S707 that the range-finding point selection button 010 was not pressed. In step S716, the control unit 101 determines whether the electrostatic capacitance output value S satisfies S≥b2, in response to a press direction operation of the photographer's finger input to the touch operation member 012, which is detected by the touch sensing circuit 111. If the control unit 101 determines that the electrostatic capacitance output value S satisfies S≥b2, the control unit 101 proceeds to step S712 to perform the shooting preparation operations. Otherwise, the control unit 101 returns to step S707 and once again performs the determination of whether or not the range-finding point selection button 010 has been pressed. After proceeding to step S712, the control unit 101 executes the processing in steps S712 to S714 described above.

Figure 6:
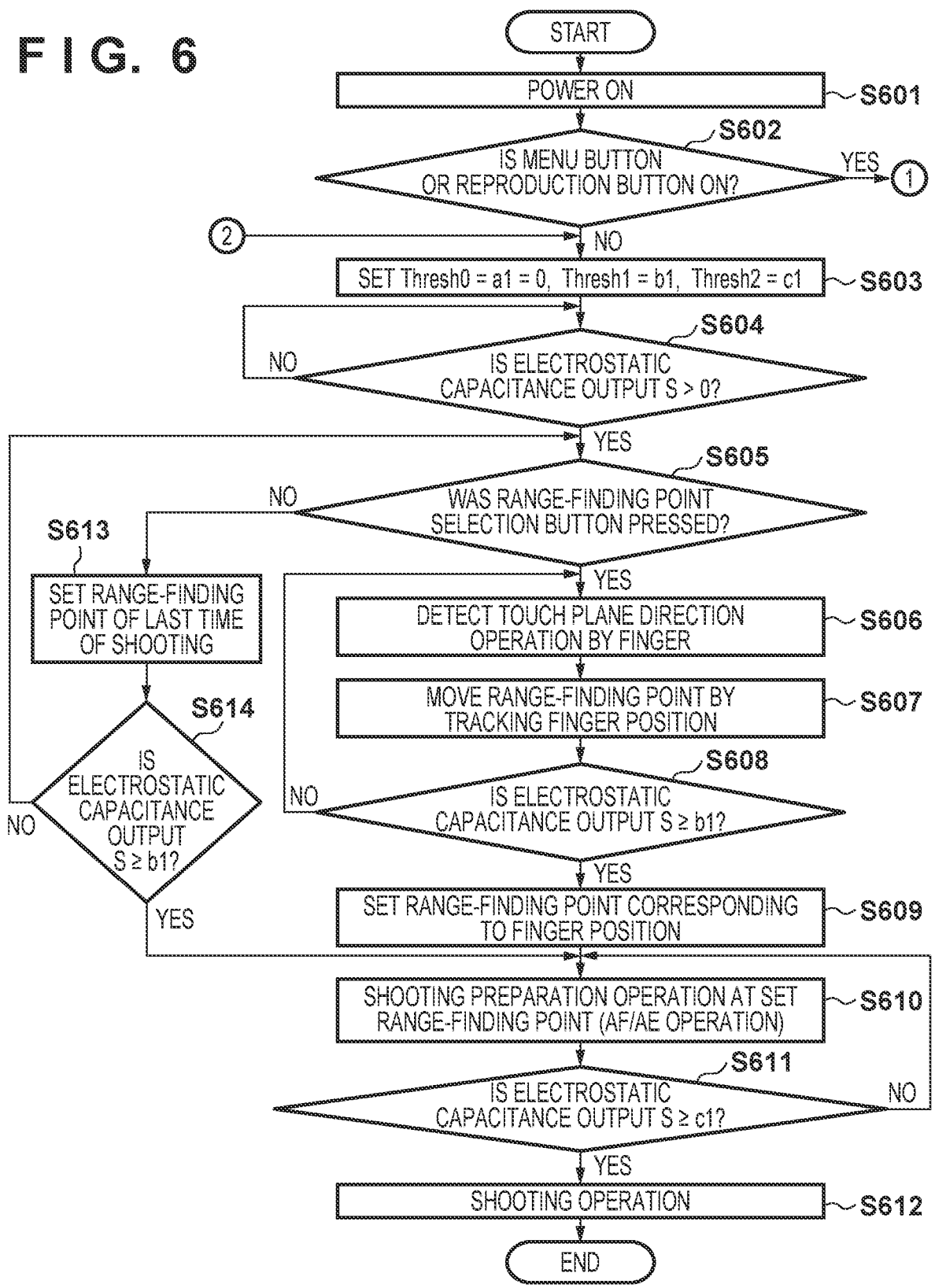
FIG. 6 is a diagram showing a series of operations performed until shooting is performed, in the shooting standby state according to the present embodiment.
Figure 7:
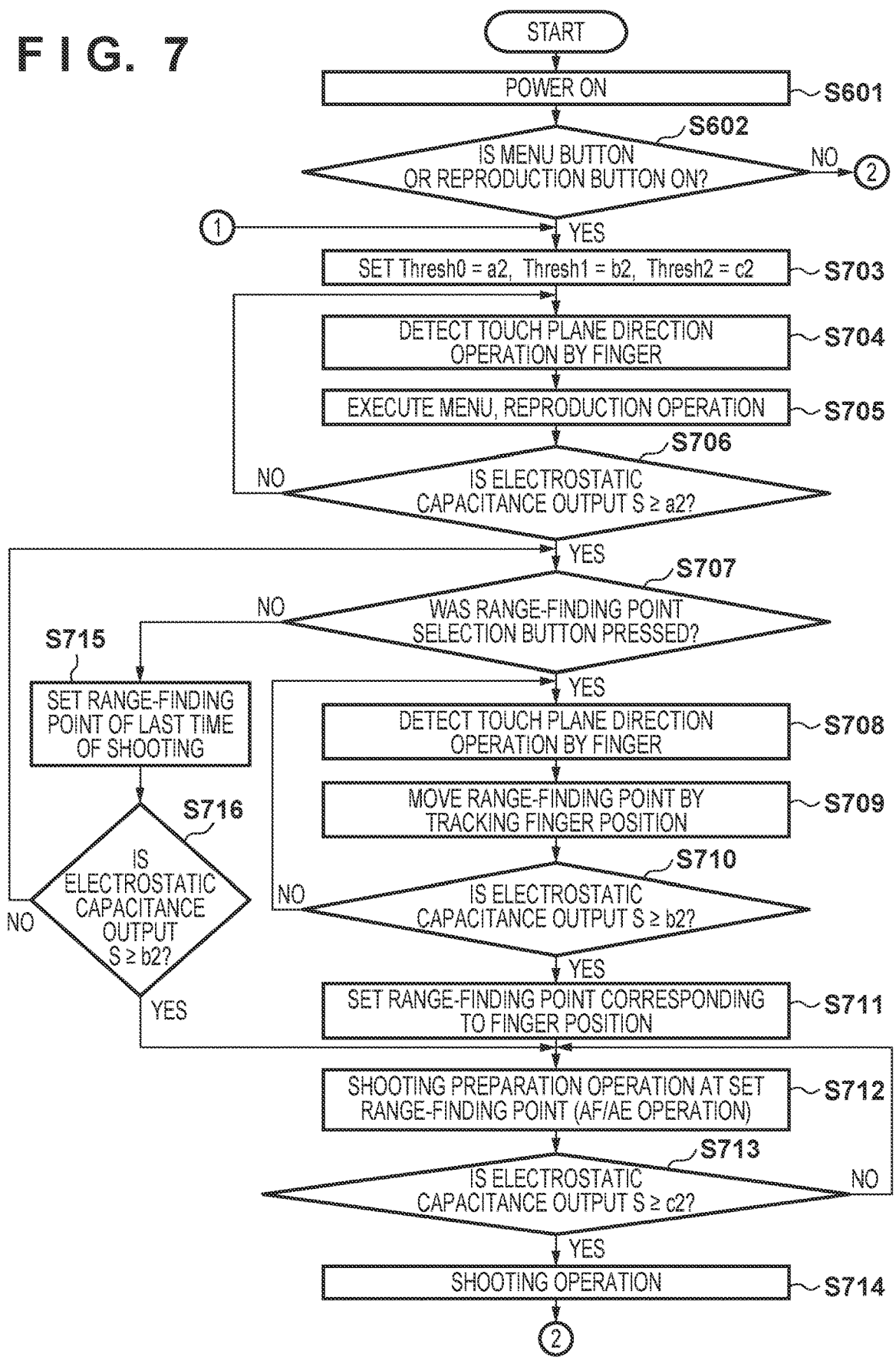
FIG. 7 is a diagram showing a series of operations during shooting in a state other than the shooting standby state of the digital camera according to the present embodiment.

Note that, in the processing according to FIG. 7 described above, an example has been described in which a transition to the processing in FIG. 6, which is started in the shooting standby state, is made if the shooting operation in step S714 is performed. However, in the present embodiment, the transition to processing performed in the shooting standby state (from the processing in FIG. 7, which is performed in a state other than the shooting standby state) may be made at a timing at which processing other than the shooting operations is performed. For example, the control unit 101 may proceed to step S603, which is processing corresponding to the shooting standby state, after the control unit 101 determines that S≥b2 is satisfied in S710 or S716, and the control unit 101 may then execute the shooting preparation operations and the shooting operation using the threshold values b1 and c1. In this case, the threshold value b1 is smaller than the threshold value b2, and the threshold value c1 is greater than the threshold value b2. In this case, a configuration may be adopted such that, if the control unit 101 determines that S≥b2 is not satisfied, not only is no transition to the shooting standby state made but also no processing in response to pressing is performed. With such a configuration, while the transition to the shooting standby state and mis-operations are suppressed during menu setting operations and reproduction operations, operations can be performed quickly and with a light press after the transition to the shooting standby state. Furthermore, a configuration may be adopted such that, if the control unit 101 determines that S≥a2 is satisfied in S706, the control unit 101 proceeds to step S603, which is processing corresponding to the shooting standby state, and executes the shooting preparation operations and the shooting operation using the threshold values b1 and c1. In this case, while the transition to the shooting standby state is suppressed during menu setting operations and reproduction operations, operations can be performed quickly and with a light press after the transition to the shooting standby state. That is, the photographer can quickly and nimbly provide a shooting preparation instruction with a small amount of force in the shooting standby state, while a situation in which the photographer accidentally causes the transition from a state other than the shooting standby state to the shooting standby state is prevented.

In such a manner, the present embodiment enables a photographer to perform menu setting operations and reproduction operations without the need to change the position of the index finger and while maintaining a stable holding state at all times, and is capable of providing a touch operation member with good operability and with which unintentional transition to shooting operations is not made. Furthermore, the photographer can initiate the transition to the state SW0 by performing a slightly strong press direction operation on the touch operation member even during states for menu setting operations and reproduction operations, and is capable of performing continuous and quick shooting operations. That is, the photographer can perform an operation with respect to a specific operation member quickly and with a small amount of force, while the occurrence of mis-operations is suppressed.

A preferable embodiment of the present invention has been described. However, the present invention is not limited to this embodiment, and various modifications and alterations are possible within the gist thereof.

Note that the various types of control which are described above as being performed by the control unit 101 may be performed by a single piece of hardware, or a plurality of pieces of hardware (for example, a plurality of processors and circuits) may control the entire apparatus by sharing the processing.

Furthermore, while the present invention has been described in detail based on a suitable embodiment thereof, the present invention is not limited to this specific embodiment and various forms that do not depart from the gist of this invention are included in the present invention. Furthermore, each embodiment described above merely shows one embodiment of the present invention, and each embodiment can be combined with other embodiments, as appropriate.

Furthermore, in the above-described embodiment, the present invention has been described taking, as an example, a case in which the present invention is applied to a digital camera capable of detecting a pressing force applied to a specific operation member. However, the present invention is not limited to this example, and the present invention is applicable to any apparatus capable of detecting a pressing force applied to a specific operation member. That is, the present invention is applicable to personal computers and PDAs, portable telephone terminals including smartphones, tablet PCs, game machines, medical devices, etc.

Furthermore, the present invention is not limited to being applied to a digital camera itself, and is also applicable to a control apparatus that communicates with an image capturing apparatus (including network cameras) through wired or wireless communication and remotely controls the image capturing apparatus. For example, smartphones, tablet PCs, desktop PCs, wristwatch-type and spectacle-type wearable information terminals, etc., can be mentioned as apparatuses for remotely controlling an image capturing apparatus. An image capturing apparatus can be remotely controlled by providing, from the control apparatus side to the image capturing apparatus, a notification of commands for causing the image capturing apparatus to perform various operations and settings, based on operations performed on the control apparatus side and processing performed on the control apparatus side. Furthermore, a configuration may be adopted such that a live view image shot by an image capturing apparatus can be received through wired or wireless communication and can be displayed on the control apparatus side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2018-152435, filed Aug. 13, 2018 which is hereby incorporated by reference herein in its entirety.

What is claimed is:

1. An image capturing control apparatus comprising:
   a detector configured to detect a pressing force applied to a specific operation member; and
   at least one memory and at least one processor which function as
   a control unit configured to:
   in response to detection of pressing with a first pressure or more performed on the specific operation member during a first operation mode in which a live view image captured by an image sensor is not displayed on a display, perform control so that a transition to a second operation mode in which a live view image captured by the image sensor is displayed on the display is made;
   in response to detection of pressing with a second pressure or more performed on the specific operation member during the second operation mode, perform control so that a shooting preparation process is performed, the second pressure being smaller than the first pressure; and
   in response to detection of pressing with a third pressure or more performed on the specific operation member during the second operation mode, perform control so that shooting by the image sensor is performed and an image obtained by the shooting is stored as an image file, the third pressure being greater than the second pressure.

2. An image capturing control apparatus comprising:
   a detector configured to detect a pressing force applied to a specific operation member; and
   at least one memory and at least one processor which function as
   a control unit configured to:
   in response to detection of pressing with a first pressure or more performed on the specific operation member during a first operation mode in which a specific shooting setting of an image sensor is not displayed on a display, perform control so that a transition to a second operation mode in which the specific shooting setting is displayed on the display is made;
   in response to detection of pressing with a second pressure or more performed on the specific operation member during the second operation mode, perform control so that a shooting preparation process is performed, the second pressure being smaller than the first pressure; and
   in response to detection of pressing with a third pressure or more performed on the specific operation member during the second operation mode, perform control so that shooting by the image sensor is performed and an image obtained by the shooting is stored as an image file, the third pressure being greater than the second pressure.

3. The image capturing control apparatus according to claim 1,
wherein, even if pressing with a pressure smaller than the first pressure is performed on the specific operation member during the first operation mode, the control unit does not cause the transition to the second operation mode.

4. The image capturing control apparatus according to claim 3,
wherein, even if pressing with a pressure smaller than the first pressure is performed on the specific operation member during the first operation mode, the control unit does not perform processing in response to the pressing.

5. The image capturing control apparatus according to claim 3,
wherein, if pressing with a pressure smaller than the first pressure and more than or equal to a fourth pressure is performed on the specific operation member during the first operation mode, the control unit performs processing in which a selected option is set.

6. The image capturing control apparatus according to claim 1,
wherein the third pressure is greater than the first pressure.

7. The image capturing control apparatus according to claim 1,
wherein the display includes a display capable of displaying a reproduced image or a live view image.

8. The image capturing control apparatus according to claim 1,
wherein the first operation mode is a reproduction mode in which an image stored in a storage medium is reproduced and displayed on the display.

9. The image capturing control apparatus according to claim 1,
wherein the first operation mode is a menu display mode in which a setting menu of the image capturing control apparatus is displayed on the display.

10. The image capturing control apparatus according to claim 1,
wherein the second operation mode is an operation mode for performing shooting with the image sensor.

11. The image capturing control apparatus according to claim 1,
wherein the shooting preparation process is a process in which at least one of auto focus, light metering, and auto exposure is executed.

12. The image capturing control apparatus according to claim 1,
wherein the specific operation member is an operation member arranged at a position where an operation can be performed with a finger of a hand holding a grip for holding the image capturing control apparatus.

13. The image capturing control apparatus according to claim 12,
wherein the specific operation member is an operation member arranged at a position where an operation can be performed with an index finger of the hand.

14. The image capturing control apparatus according to claim 1, further comprising a touch detector capable of detecting a touch operation performed on the specific operation member.

15. The image capturing control apparatus according to claim 14,
wherein the touch detector is capable of detecting an operation of moving a touch position without the touch on the specific operation member being released, and
wherein the control unit is further capable of performing processing in accordance with the detected operation of moving the touch position.

16. The image capturing control apparatus according to claim 14,
wherein the touch detector is capable of detecting the operation of moving a touch position without the touch on the specific operation member being released, and
wherein the control unit, in response to the detection of pressing with the first pressure or more, performs control so that the transition from the first operation mode to the second operation mode is made, even without the operation of moving the touch position, and during the second operation mode, the control unit, in response to the detection of pressing with the third pressure or more, performs control so that the shooting and the storing are performed, even without the operation of moving the touch position.

17. The image capturing control apparatus according to claim 1, further comprising the image sensor.

18. A control method of an image capturing control apparatus including a detector configured to detect a pressing force applied to a specific operation member, the control method comprising:
in response to detection of pressing with a first pressure or more performed on the specific operation member during a first operation mode in which a live view image captured by an image sensor is not displayed on a display, performing control so that a transition to a second operation mode in which a live view image captured by the image sensor is displayed on the display is made;
in response to detection of pressing with a second pressure or more performed on the specific operation member during the second operation mode, performing control so that a shooting preparation process is performed, the second pressure being smaller than the first pressure; and
in response to detection of pressing with a third pressure or more performed on the specific operation member during the second operation mode, performing control so that shooting by the image sensor is performed and an image obtained by the shooting is stored as an image file, the third pressure being greater than the second pressure.

19. A control method of an image capturing control apparatus including a detector configured to detect a pressing force applied to a specific operation member, the control method comprising:
in response to detection of pressing with a first pressure or more performed on the specific operation member during a first operation mode in which a specific shooting setting of an image sensor is not displayed on a display, performing control so that a transition to a second operation mode in which the specific shooting setting is displayed on the display is made;
in response to detection of pressing with a second pressure or more performed on the specific operation member during the second operation mode, performing control so that a shooting preparation process is performed, the second pressure being smaller than the first pressure; and in response to detection of pressing with a third pressure or more performed on the specific operation member during the second operation mode, performing control so that shooting by the image sensor is performed and an image obtained by the shooting is stored as an image file, the third pressure being greater than the second pressure.

20. A non-transitory computer-readable storage medium storing a program for causing a computer to execute a control method of an image capturing control apparatus including a detector configured to detect a pressing force applied to a specific operation member, the control method comprising:

in response to detection of pressing with a first pressure or more performed on the specific operation member during a first operation mode in which a live view image being captured by an image sensor is not displayed on a display, performing control so that a transition to a second operation mode in which a live view image being captured by the image sensor is displayed on the display is made;

in response to detection of pressing with a second pressure or more performed on the specific operation member during the second operation mode, performing control so that a shooting preparation process is performed, the second pressure being smaller than the first pressure; and in response to detection of pressing with a third pressure or more performed on the specific operation member during the second operation mode, performing control so that shooting by the image sensor is performed and an image obtained by the shooting is stored as an image file, the third pressure being greater than the second pressure.

21. A non-transitory computer-readable storage medium storing a program for causing a computer to execute a control method of an image capturing control apparatus including a detector configured to detect a pressing force applied to a specific operation member, the control method comprising:

in response to detection of pressing with a first pressure or more performed on the specific operation member during a first operation mode in which a specific shooting setting of an image sensor is not displayed on a display, performing control so that a transition to a second operation mode in which the specific shooting setting is displayed on the display is made;

in response to detection of pressing with a second pressure or more performed on the specific operation member during the second operation mode, performing control so that a shooting preparation process is performed, the second pressure being smaller than the first pressure; and in response to detection of pressing with a third pressure or more performed on the specific operation member during the second operation mode, performing control so that shooting by the image sensor is performed and an image obtained by the shooting is stored as an image file, the third pressure being greater than the second pressure.

* * * * *